(12) United States Patent
Cheng

(10) Patent No.: US 10,040,207 B1
(45) Date of Patent: Aug. 7, 2018

(54) ADJUSTABLE PASSIVE GRAVITY COMPENSATION APPARATUS

(71) Applicant: Institute of Nuclear Energy Research, Atomic Energy Council, Executive Yuan, R.O.C., Taoyuan (TW)

(72) Inventor: Kuei-Jen Cheng, Taoyuan (TW)

(73) Assignee: Institute of Nuclear Energy Research, Atomic Energy Council, Executive Yuan, R.O.C., Lungtan, Taoyuan (TW)

( * ) Notice: Subject to any disclaimer, the term of this patent is extended or adjusted under 35 U.S.C. 154(b) by 0 days.

(21) Appl. No.: 15/706,910

(22) Filed: Sep. 18, 2017

(51) Int. Cl.
- *B25J 17/00* (2006.01)
- *B25J 17/02* (2006.01)
- *B25J 18/00* (2006.01)
- *B25J 19/00* (2006.01)
- *F16F 13/00* (2006.01)

(52) U.S. Cl.
CPC ........... *B25J 19/0012* (2013.01); *B25J 18/00* (2013.01); *B25J 19/0016* (2013.01); *F16F 13/007* (2013.01)

(58) Field of Classification Search
CPC .... B25J 18/00; B25J 19/0008; B25J 19/0012; B25J 19/0016; F16F 13/007
See application file for complete search history.

(56) References Cited

U.S. PATENT DOCUMENTS

| 2008/0205975 A1* | 8/2008 | Van Ham | B25J 19/0016 403/81 |
| 2013/0157501 A1* | 6/2013 | Ishii | B25J 9/1065 439/527 |
| 2014/0245855 A1* | 9/2014 | Nakamura | B25J 9/1065 74/490.05 |
| 2016/0346940 A1* | 12/2016 | Bax | B25J 19/0016 |

* cited by examiner

*Primary Examiner* — Jake Cook
(74) *Attorney, Agent, or Firm* — Jackson IPG PLLC; Demian K. Jackson

(57) ABSTRACT

The present invention is a novel passive adjustable gravity compensation apparatus which utilizes an internal-pressure-variable cylinder. With the coordination of cam, rod, or the combination of the fore mentioned, the internal-pressure-variable cylinder obtains the characteristics of a linear elastic device which has variable elastic coefficient. Through appropriately adjusting the internal pressure of the internal-pressure-variable cylinder, the cylinder would perform as a linear elastic device with proper elastic coefficient to fully or partially compensate the gravitational effect of the manipulator system and the load it holds. Thus, the proposed invention can fully or partially compensate the gravitational effect of the manipulator system at different loading conditions without changing its geometric configuration.

7 Claims, 5 Drawing Sheets

US 10,040,207 B1

ADJUSTABLE PASSIVE GRAVITY COMPENSATION APPARATUS

TECHNICAL FIELD OF THE INVENTION

The present invention relates to a novel apparatus for gravity compensation; more particularly, using an adjustable-internal-pressure cylinder with the coordination of a cam, a link, or the combination of the fore mentioned. to obtain the characteristics of a linear elastic device which has adjustable elastic coefficient to compensate the gravitational effect of a manipulator and the load it holds, where, by using the adjustable-internal-pressure cylinder with the appropriate configuration and coordination of the cam, the link, and the combination of the fore mentioned, the present invention obtains the characteristics of a linear elastic device which has adjustable elastic coefficient to fully or partially compensate the gravitational effect of a manipulator and the load it holds; and, thus, the present invention can be applied to compensate different loads passively without changing its geometric configuration of the apparatus.

DESCRIPTION OF THE RELATED ARTS

It is necessary for a manipulator (such as a robot arm) to equip large capacity of actuators (such as motors) to overcome the self-weight of the manipulator and the load it holds even without considering the need on kinetics. Such large capacity actuators would increase the weight and size of the manipulator and affect its applicability. Traditionally, when a manipulator moves from one posture to another, the actuators need to compensate the variation in the gravitational energy of the manipulator system, and this would increase the energy consumption and the operation cost. Besides, when a manipulator equipped actuators with larger capacity, this would increase the fabrication cost and the risk for the operators.

After a manipulator is equipped with a passive gravity compensation apparatus, the required output capacity of the actuators can be reduced significantly and so can the operation cost and risk. However, the majority of the gravity compensation apparatus are just used for fixed load, and this significantly reduces their applicability.

Currently, the approach used to get the adjustable passive gravity compensation function is utilizing a special design device which can change the configuration of the passive gravity compensation apparatus which has been equipped to a manipulator. However, such special design device is complex, heavy, and hard to be installed in manipulators.

Therefore, the prior art may not meet with the requirement for the user's actual need.

SUMMARY OF THE INVENTION

The main purpose of the present invention is to utilize an adjustable-internal-pressure cylinder with the coordination of a cam, a link, or the combination of the fore mentioned to obtain the characteristics of a linear elastic device which has adjustable elastic efficient to fully or partially compensate the gravitational effect of a manipulator and the load it holds. When being implemented, adjusting the internal pressure of the adjustable-internal-pressure cylinder would change the equivalent elastic coefficient of the present invention to meet the need on gravity compensation of a manipulator and the load it holds.

To achieve the above purpose, the present invention is an adjustable passive gravity compensation apparatus, comprising a base, at least one first link, at least one adjusting pin, at least one elastic device (such as spring), at least one first link pin, at least one displacement-compensation device, at least one base pin, at least one adjustable-internal-pressure cylinder and an expansion port, where the base has a direction parallel to the direction of gravity; the adjusting pin comprises an end plate, a spring pin and a cable pin; the cable pin is connected to the spring pin; the spring pin is connected to the end plate; the elastic device has fixed elastic coefficient; the first link is connected to the base through the first link pin and rotate relatively; the displacement-compensation device comprises a cable and a cam; one end of the cable is connected to the cam; the cam is fixed with the first link to rotate together; one end of the elastic device is connected to the base through the base pin; the other end of the elastic device is connected to the first link through the spring pin; the adjustable-internal-pressure cylinder comprises a cylinder, a piston rod and a valve; the piston rod is partially located inside the cylinder; the valve is located outside the cylinder; one end of the adjustable-internal-pressure cylinder is connected to the base through the base pin; the other end of the adjustable-internal-pressure cylinder is connected to the other end of the cable; the cable would move along the cable pin; with the coordination of the cable pin, the adjustable-internal-pressure cylinder and the first link are interlocked, and the cylinder would be parallel to the elastic device; the expansion port can be used to install a gripper or connect other links to form a multi-link manipulator; and, when a load exerted on the expansion port changes, appropriately adjust the internal pressure of the adjustable-internal-pressure cylinder and with the coordination of the displacement-compensation device and the cable pin, the adjustable-internal-pressure cylinder would be like a linear elastic device with proper elastic coefficient to fully or partially compensate the load. Accordingly, a novel adjustable passive gravity compensation apparatus is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENTS

The following description of the preferred embodiments is provided to understand the features and the structures of the present invention.

Figure 1:
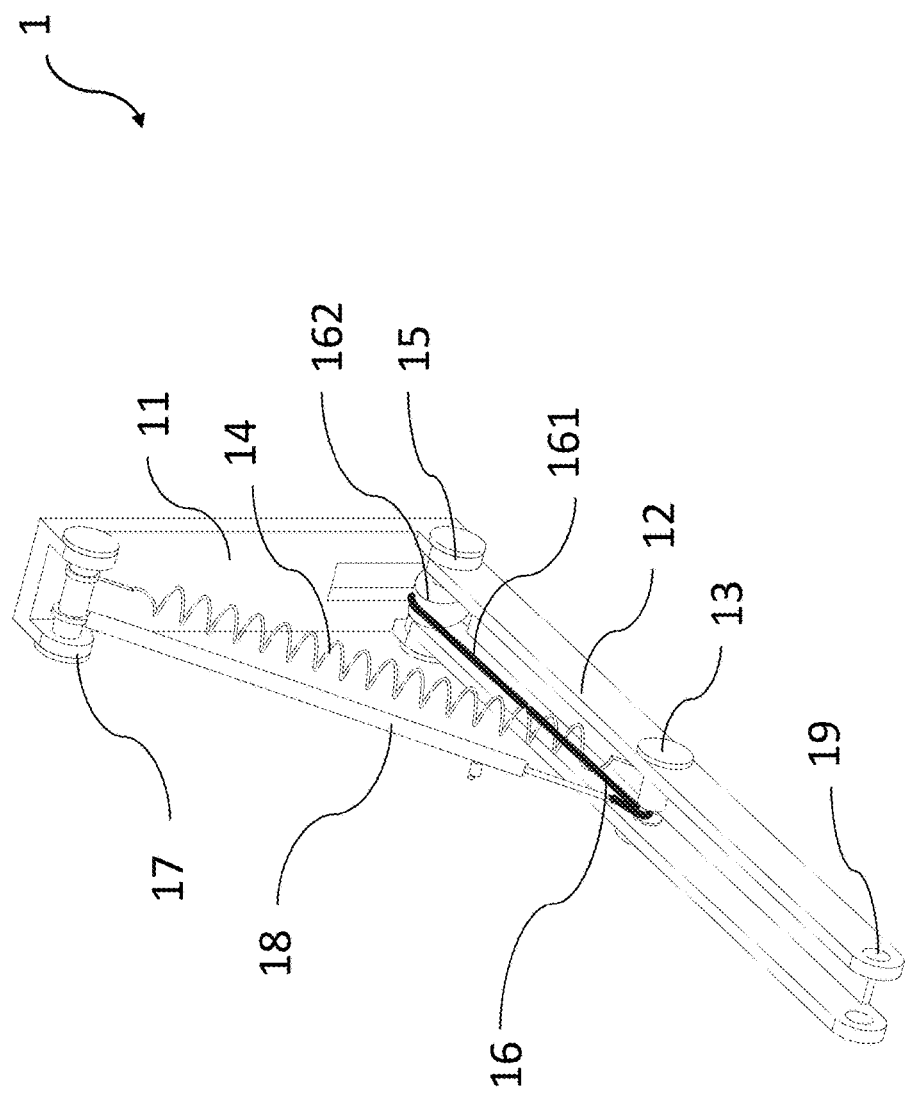
FIG. 1 is the perspective view showing the first preferred embodiment according to the present invention.
Figure 2:
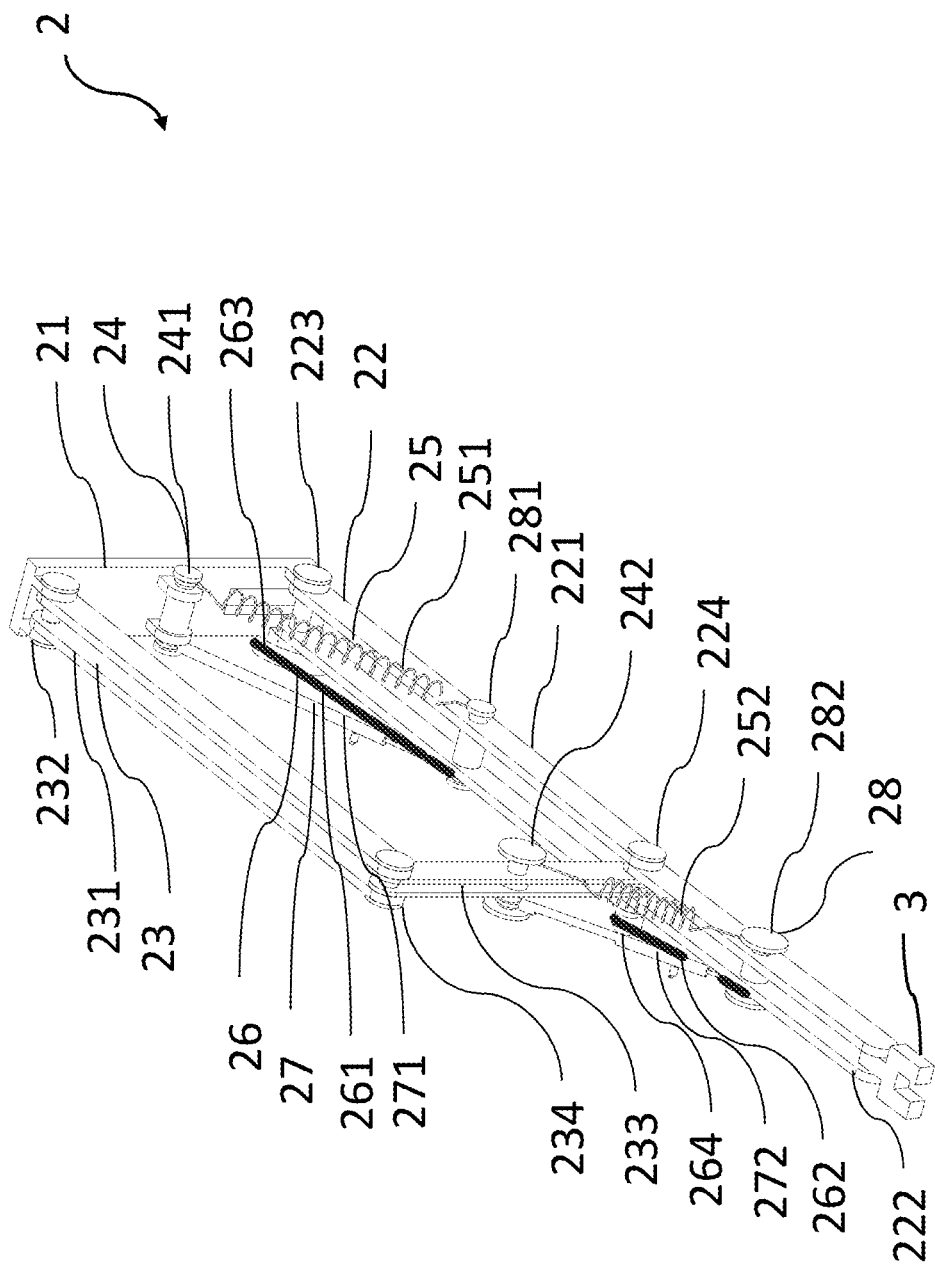
FIG. 2 is the perspective view showing the second preferred embodiment.

Please refer to FIG. 1-FIG. 5, which are perspective views showing a first and a second preferred embodiments according to the present invention; a perspective view showing an adjusting pin; a partial sectional perspective view showing an adjustable-internal-pressure cylinder; and a view used for explaining the fundamentals utilized by present invention. As shown in the figures, the present invention is a passive adjustable gravity compensation apparatus. In FIG. 1, a first preferred embodiment is a single-link manipulator equipped with the present invention 1, which comprises a base 11, a first link 12, an adjusting pin 13, a spring 14, a link pin 15, a displacement-compensation device 16, a base pin 17, an adjustable-internal-pressure cylinder 18 and an expansion port 19.

Figure 3:
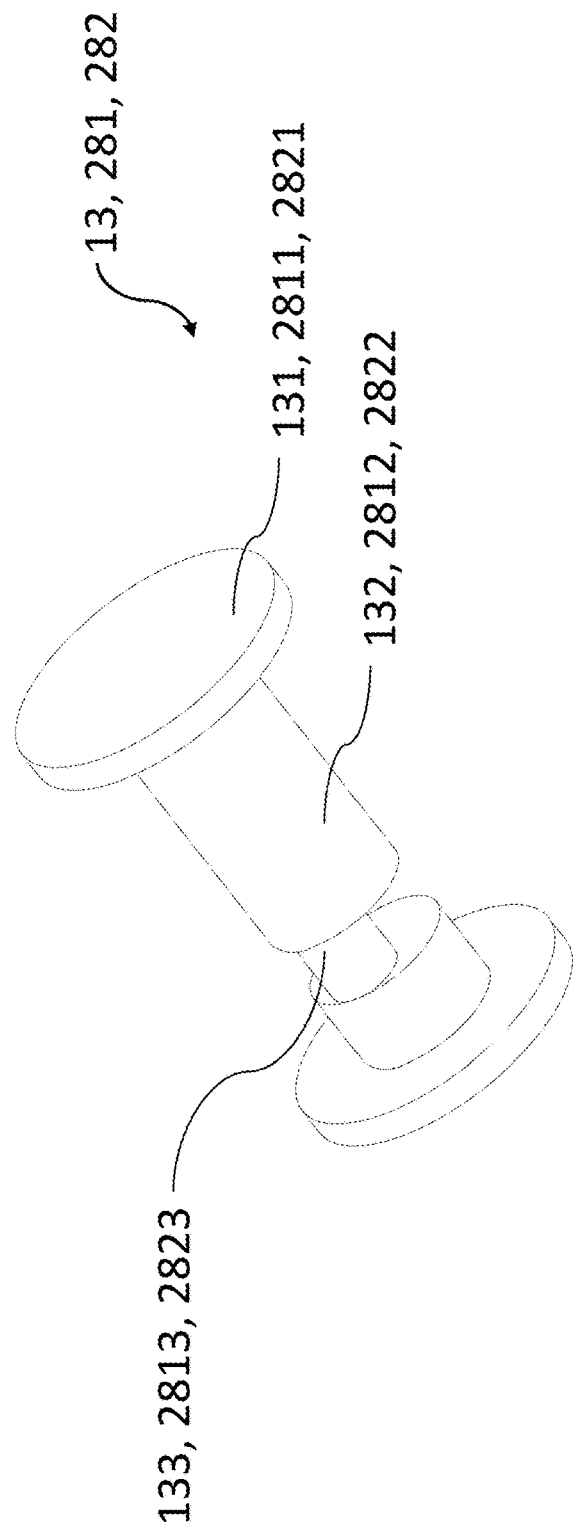
FIG. 3 is the perspective view showing the adjusting pin.

The adjustment pin 13 comprises an end plate 131, a spring pin 132 and a cable pin 133. The cable pin 133 is connected to the spring pin 132; and the spring pin 132 is connected to the end plate 131, as shown in FIG. 3.

The displacement-compensation device 16 comprises a cable 161 and a cam 162.

Figure 4:
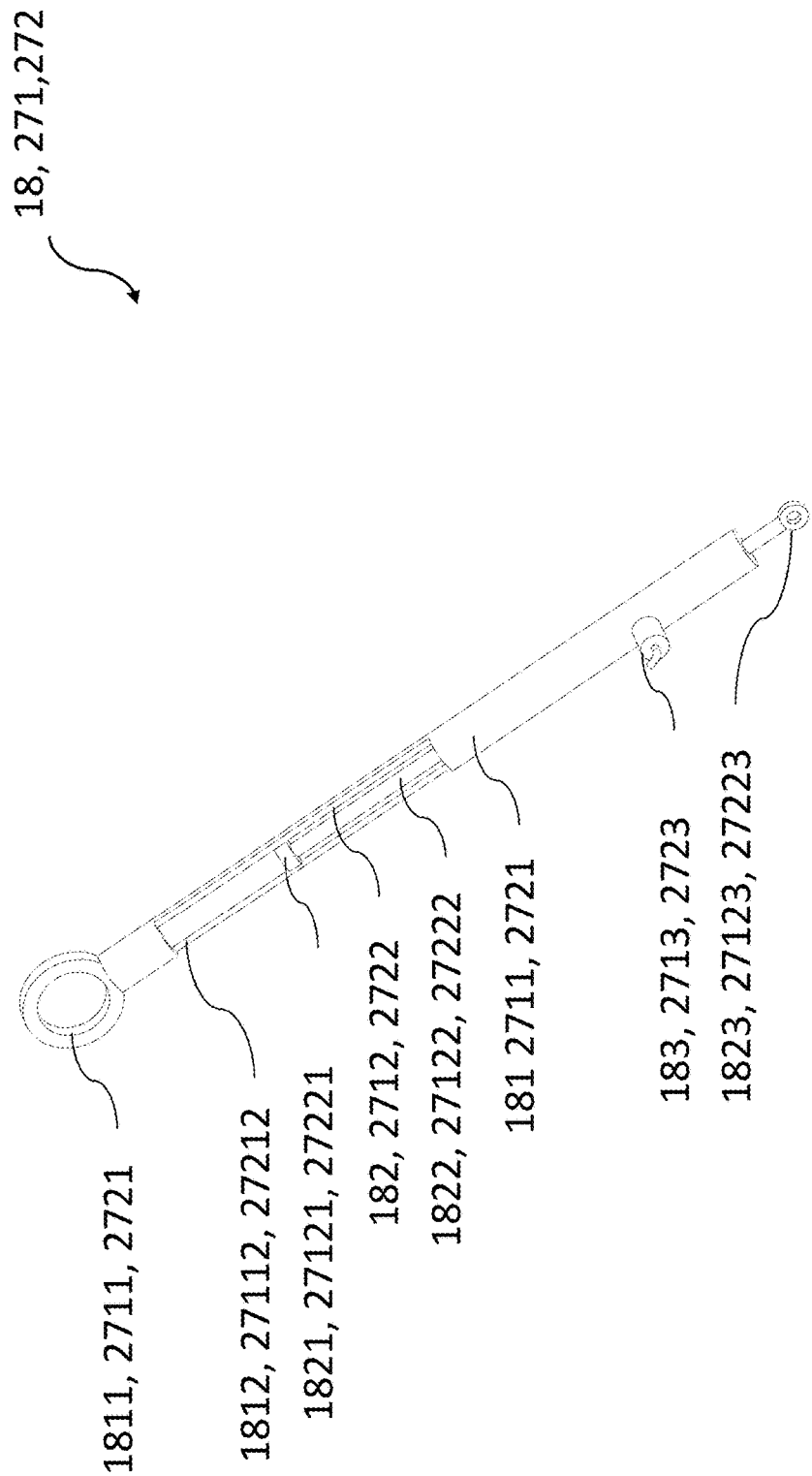
FIG. 4 is the partial sectional perspective view showing the adjustable-internal-pressure cylinder.
Figure 5:
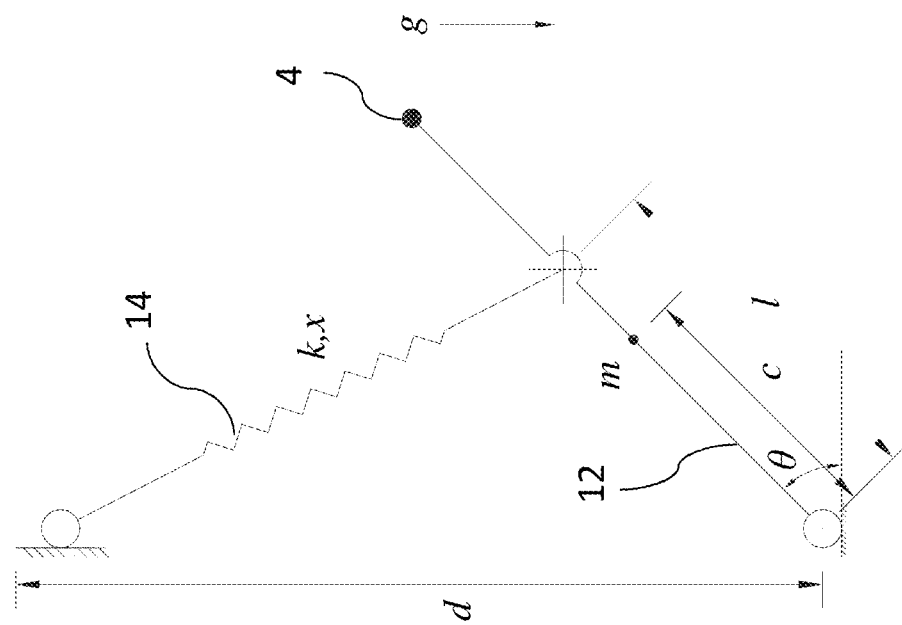
FIG. 5 is the view used for explaining the fundamentals utilized by present invention.

The adjustable-internal-pressure cylinder 18 comprises a cylinder 181, a piston rod 182 partially inside the cylinder 181, and a valve 183 outside the cylinder 181. Therein, as shown in FIG. 4, the cylinder 181 comprises a base ring 1811 and a cylinder body 1812; the piston rod 182 comprises a piston 1821, a second rod 1822 and a cable ring 1823; one end of the second rod 1822 Is connected to the piston 1821; and the other end of the second rod 1822 is extended out from inside the cylinder 181 and connected to the cable ring 1823. The adjustable-internal-pressure cylinder 18 is directly connected to the first link 12, or is indirectly connected to the first link 12 through a rope and a pulley.

The direction of the base 11 is parallel to the direction of gravity and the base 11 is connected to the first link 12 through the link pin 15, so that the first link 12 and the base 11 can rotate relatively. One end of the spring 14 is connected to the base 11 through the base pin 17, and the other end of the spring 14 is connected to the first link 12 through the spring pin 132. One end of the adjustable-internal-pressure cylinder 18 is connected to the base 11 through the base pin 17, and the cable ring 1823 located at the other end of the adjustable-internal-pressure cylinder 18 is connected to the other end of the cable 161. The cable 161 moves along the cable pin 133. One end of the cable 161 is connected to the cam 162, and the cam 162 is fixed with the first link 12 and together. With the coordination of the cable pin 133, the adjustable-internal-pressure cylinder 18 and the first link 12 are interlocked, and the adjustable-internal-pressure cylinder 18 would be parallel to the spring 14. Thus, a novel passive adjustable gravity compensation apparatus is obtained.

The elastic coefficient of spring 14 is preset according to some requirements so that the spring 14 can fully or partially compensate the gravitational effect of the first link 12. The single-link manipulator 1 of the first preferred embodiment is taken as an example when the spring 14 completely compensate the gravitational effect of the first link 12. The elastic coefficient of the spring 14 can be set according to the following formula:

$$k=mgc/dl,$$

where m is the equivalent mass of the first link 12 and the load 4 (the mass of the device installed in the expansion port 19, such as the gripper); c is the distance from the equivalent mass center of the first link 12 and the load 4 to the axis of the link pin 15; k is the elastic coefficient of the spring (elastic device) 14; d is the vertical distance from one end of the spring 14 to the axis of the link pin 15; l is the distance from the other end of the spring 14 to the axis of the link pin 15 along the first link 12; and g is the gravitational acceleration.

When $k=mgc/dl$ is used and without considering the influence of friction or other resistance, the total potential energy of the manipulator system (elastic potential energy+ gravitational potential energy) keeps in constant. In other words, regardless of the posture of the manipulator system, the balance keeps. Therefore, when the manipulator system changes its posture, the actuator does not need to account for the gravitational effect.

When the gripper installed in the expansion port 19 holds an object, and the load exerting on the expansion port 19 changes, appropriately changing k is necessary to fulfill the function of gravity compensation.

When the expansion port 19 equipped with the gripper which holds an object whose equivalent weight is Mg, by appropriately adjusting the internal pressure of the adjustable-internal-pressure cylinder 18 and with the coordination of the displacement-compensation device 16 and the cable pin 133, the adjustable-internal-pressure cylinder 18 would perform as the elastic device or spring whose elastic coefficient is $k=Mgc/dl$ to fully compensate the gravitational effect of the object being held. Through adjusting the internal pressure of the adjustable-internal-pressure cylinder 18, the single-link manipulator equipped with the present invention can fully or partially compensate the gravitational effect of different loads without changing its geometrical configuration.

A second preferred embodiment is the present invention implemented to a two-link manipulator 2, which comprises a base 21, a link set 22, an auxiliary link set 23, a base pin set 24, a spring set 25, a displacement-compensation device set 26, an adjustable-internal-pressure cylinder set 27, an adjustment pin set 28 and a gripper 3.

The link set 22 comprises a first link 221, a second link 222, a first link pin 223 and a second link pin 224.

The auxiliary link set 23 comprises an auxiliary horizontal link 231, an auxiliary horizontal link pin 232, an auxiliary vertical link 233 and an auxiliary vertical link pin 234.

The base pin set 24 comprises a first link base pin 241 and a second link base pin 242.

The spring set 25 comprises a first link spring 251 and a second link spring 252.

The displacement-compensation device set 26 comprises a first link cable 261, a second link cable 262, a first link cam 263 and a second link cam 264.

The adjustable-internal-pressure cylinder set 27 comprises a first link adjustable-internal-pressure cylinder 271 and a second link adjustable-internal-pressure cylinder 272. Therein, as shown in FIG. 4, the first link adjustable-internal-pressure cylinder 271 comprises a first link cylinder 2711, a first link piston rod 2712 which locates partially inside the first link cylinder 2711, and a first link valve 2713 which locates outside the first link cylinder 2711; the first link cylinder 2711 comprises a first link base ring 27111 and a first link cylinder body 27112; the first link piston rod 2712 comprises a first link piston 27121, a second first link rod 27122 and a first link cable ring 27123; one end of the second first link rod 27122 is connected to the first link piston 27121; the other end of the second first link rod 27122 is extended out from the first link cylinder 2711 and connected to the first link cable ring 27123; the second link adjustable-internal-pressure cylinder 272 comprises a second link cylinder 2721, a second link piston rod 2722 which locates partially inside the second link cylinder 2721, and a second link valve 2723 which locates outside the second link cylinder 2721; the second link cylinder 2721 comprises a second link base ring 27211 and a second link cylinder body 27212; the second link piston rod 2722 comprises a second link piston 27221, a second second link rod 27222 and a second link cable ring 27223; one end of the second second link rod 27222 is connected to the second link piston 27221;

the other end of the second second link rod 27222 is extended out from inside the second link cylinder 2721 and connected to the second link cable ring 27223. The adjustable-internal-pressure cylinder set 27 is directly connected to the link set 22 or is indirectly connected to the link set 22 through ropes and pulleys.

The adjusting pin 28 comprises a first link adjusting pin 281 and a second link adjusting pin 282. Therein, the first link adjustment pin 281 comprises a first link end plate 2811, a first link spring pin 2812 and a first link cable pin 2813; the first link cable pin 2813 is connected to the first link spring pin 2812; the first link spring pin 2812 is connected to the first link end plate 2811; the second link adjustment pin 282 comprises a second link end plate 2821, a second link spring pin 2822 and a second link cable pin 2823; the second link cable pin 2823 is connected to the second link spring pin 2822; and, the second link spring pin 2822 is connected to the second link end plate 2821.

The direction of the base 21 is parallel to the direction of gravity, and one end of the first link 221 is connected to the base 21 through the first link pin 223, so the first link 221 and the base 21 can rotate relatively. The other end of the first link 221 is connected to one end of the second link 222 through the second link pin 224, so that the first link 221 and the second link 222 can rotate relatively. The other end of the second link 222 is equipped with the gripper 3 or is connected to other links to form a multi-link manipulator.

One end of the auxiliary horizontal link 231 of the auxiliary link set 23 is connected to the base 21 through the auxiliary horizontal link pin 232. The other end of the auxiliary horizontal link 231 is connected to one end of the auxiliary vertical link 233 through the auxiliary vertical link pin 234. The other end of the auxiliary vertical link 233 is connected to the first link 221 through the second link pin 224. The base 21, the first link 221, the auxiliary horizontal link 231 and the auxiliary vertical link 233 would form a parallelogram configuration.

One end of the first link spring 251 of the spring set 25 is connected to the base 21 through the first link base pin 241; and the other end of the first link spring 251 is connected to the first link 221 through the first link spring pin 2812. The other end of the second link spring 252 is connected to the auxiliary vertical link 233 through the second link base pin 242; and the other end of the second link spring 252 is connected to the second link 222 through the second link spring pin 2822.

The first link cam 263 is fixed to the first link 221 and can rotate with the first link 221. One end of the first link cable 261 is connected to the first link cam 263; the other end of the first link cable 261 is connected to the first link cable ring 27123 of the first link adjustable-internal-pressure cylinder 271; the first link cable 261 moves along the first link cable pin 2813; and the other end of the first link adjustable-internal-pressure cylinder 271 is connected to the base 21 through the first link base pin 241. The second link cam 264 is fixed to the second link 222 and can rotate with the second link 222. One end of the second link cable 262 is connected to the second link cam 264; the other end of the second link cable 262 is connected to the second link cable ring 27223 of the second link adjustable-internal-pressure cylinder 272; the second link cable 262 moves along the second link cable pin 2823; and the other end of the second link adjustable-internal-pressure cylinder 272 is connected to the auxiliary vertical link 233 through the second link base pin 242.

When implementing the present invention, the gripper 3 is used to hold an object or is an expansion port for extending into a multi-link manipulator with more than two links. A parallelogram is formed by the auxiliary link set 23, the base 21, and the first link 221, so that the auxiliary vertical link 233 and the base 21 are kept parallel to the direction of gravity. By appropriately setting the elastic coefficients of the first link spring 251 and the second link spring 252 through the formula of $k=mgc/dl$, the first spring 251 can fully or partially compensate all the gravitational effect of the first link 221 including those ones transferred from the auxiliary link set 23 and the second link 222. In addition, by appropriately setting the elastic coefficient of the second link spring 252 through the formula of $k=mgc/dl$, the second link spring 252 can fully or partially compensate all the gravitational effect of the second link 222 and the gripper 3. After appropriately adjusting the internal pressure of the second link adjustable-internal-pressure cylinder 272 and with the coordination of the second link cam 264, the second link cable 262 and the second link cable pin 2823, the second link adjustable-internal-pressure cylinder 272 would have the characteristics of an elastic device or a spring whose the elastic coefficient is $k=Mgc/dl$ and can fully or partially compensate the object whose equivalent weight is Mg and held by gripper 3. In addition, after appropriately adjusting the internal pressure of the first link adjustable-internal-pressure cylinder 271 and with the coordination of the first link cam 263, the first link cable 261 and the first cable pin 2813, the first link adjustable-internal-pressure cylinder 271 would have the characteristics of an elastic device or a spring with appropriate elastic coefficient which can fully or partially compensate all the gravitational effect resulted from the object held by the gripper 3. Through adjusting the internal pressure of the first link adjustable-internal-pressure cylinder 271 and the second link adjustable-internal-pressure cylinder 272, a two-link manipulator which is equipped with the present invention can fully or partially compensate all the gravitational effect from the manipulator and the object it holds without changing the geometrical configurations.

As described in the above, the present invention can be applied to a single-link, two-link or multi-link manipulator. Although only the single-link and two-link manipulators are shown, the logic and method for applying the present invention to a multi-link manipulator is feasible by referring to the preferred embodiments of the single-link and two-link cases.

Without considering friction and other possible resistance, the present invention utilizes special designed elastic devices to keep the total potential energy of the manipulator system invariable at different loading conditions. Thus, the required output of the actuators used for compensating the change of the gravitational potential energy of the manipulator at different postures can be reduced. Hence, the present invention has the following advantages:

1. The present invention uses a special designed elastic device with adjustable elastic coefficient (consisted of an adjustable-internal-pressure cylinder, a cam, a link, etc.) to keep the total potential energy of a manipulator system invariable at any posture in the workspace.

2. In order to increase the capacity of gravity compensation, the elastic device with fixed elastic coefficient (spring) is used to compensate the gravitational effect of the manipulator itself. In addition, the elastic device with adjustable elastic coefficient (consisted of the adjustable-internal-pressure cylinder, the cam, the link, etc.) is used to compensate gravitational effect of the load or the object held by the manipulator. Thus, the range of the gravity compensation of the present invention can be maximized.

To sum up, the present invention is a novel adjustable passive gravity compensation apparatus, where an adjustable-internal-pressure cylinder is used with the coordination of a cam, a link, or the combination of the fore mentioned. With the assistance of the cam, the link, or the combination of the fore mentioned, the adjustable-internal-pressure cylinder would have the characteristics of a linear elastic device with adjustable elastic coefficient which can be used to fully or partially compensate the gravitational effect of a manipulator system at any posture and different loading conditions. Because the present invention can change its elastic coefficient by adjusting the internal pressure of the adjustable-internal-pressure cylinder to fully or partially compensate the gravitational effect of a manipulator system at any posture and different loading conditions, it is no need to change its geometric configuration, and this makes the present invention better in the practical applications.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. An adjustable passive gravity compensation apparatus, comprising:
    (a) a base, said base having a direction parallel to the direction of gravity;
    (b) at least one first link;
    (c) at least one adjusting pin, comprising an end plate, a spring pin and a cable pin,
        wherein said cable pin is connected to said spring pin; and said spring pin is connected to said end plate;
    (d) at least one first elastic device, said first elastic device having preset elastic coefficient;
    (e) at least one first link pin,
        wherein said base and said first link are connected through said first link pin to rotate relatively;
    (f) at least one displacement-compensation device, comprising a cable and a cam,
        wherein one end of said cable is connected to said cam; and said cam is fixed with said first link to rotate together;
    (g) at least one base pin,
        wherein one end of said first elastic device is connected to said base through said base pin and the other end of said first elastic device is connected to said first link through said spring pin;
    (h) at least one first adjustable-internal-pressure cylinder, comprising a cylinder, a piston rod and a valve,
        wherein said piston rod is partially located inside said cylinder and said valve is located outside said cylinder;
        wherein one of said first adjustable-internal-pressure cylinder is connected to said base through said base pin;
        wherein the other end of said first adjustable-internal-pressure cylinder is connected to the other end of said cable through said cable pin; and
        wherein, with the coordination and interlocking of said cable pin and said first link, said first adjustable-internal-pressure cylinder is parallel to said first elastic device; and
    (i) an expansion port,
        wherein said expansion port is used to be equipped with a gripper or extended into a multi-link manipulator,
        wherein, when holding a load by said expansion port, with the coordination of said displacement-compensation device, said cable pin, and said first elastic device with preset elastic coefficient, the gravitational effect of the manipulator and the load can be fully or partially compensated by adjusting the internal pressure of said first adjustable-internal-pressure cylinder to an appropriate pressure.

2. The passive apparatus according to claim 1,
wherein said first adjustable-internal-pressure cylinder is directly connected to said first link.

3. The passive apparatus according to claim 1,
wherein said first adjustable-internal-pressure cylinder is indirectly connected to said first link through ropes and a pulleys.

4. The passive apparatus according to claim 1,
wherein said cylinder of said first adjustable-internal-pressure cylinder comprises a base ring and a cylinder body.

5. The passive apparatus according to claim 1,
wherein said piston rod of said first adjustable-internal-pressure cylinder comprises a piston, a second rod and a cable ring;
wherein one end of said second rod is connected to said piston; the other end of said second rod is extended out from inside said cylinder and connected to said cable ring; and the other end of said cable is connected to said cable ring through said cable pin.

6. The passive apparatus according to claim 1,
wherein the passive apparatus further comprises an auxiliary link set; and said auxiliary link set comprises an auxiliary horizontal link, an auxiliary horizontal link pin, an auxiliary vertical link and an auxiliary vertical link pin; and
wherein one end of said auxiliary horizontal link is connected to said base through said auxiliary horizontal link pin; the other end of said auxiliary horizontal link is connected to one end of said auxiliary vertical link through said auxiliary vertical link pin; the other end of said auxiliary vertical link is connected to said first link through a second link pin; said auxiliary vertical link is connected to one end of a second elastic device and one end of a second adjustable-internal-pressure cylinder through a second link base pin; and the other end of said second elastic device is connected to a second link through a second link spring pin.

7. The passive apparatus according to claim 6,
wherein a form of parallelogram is obtained with said base, said first link, said auxiliary horizontal link and said auxiliary vertical link.

* * * * *